United States Patent
Keller (10) Patent No.: US 7,702,838 B2
(45) Date of Patent: Apr. 20, 2010

(54) METHOD AND APPARATUS FOR CONFIGURATION SPACE EXTENSION BUS

(75) Inventor: Emory D. Keller, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 1180 days.

(21) Appl. No.: 10/844,531

(22) Filed: May 13, 2004

(65) Prior Publication Data

US 2005/0256991 A1 Nov. 17, 2005

(51) Int. Cl.
G06F 13/14 (2006.01)

(52) U.S. Cl. .................. 710/305; 370/389; 709/203; 709/204; 709/229; 709/231

(58) Field of Classification Search .................. 710/315, 710/305; 709/203, 204, 229, 231, 236; 370/229, 370/335, 389
See application file for complete search history.

(56) References Cited

U.S. PATENT DOCUMENTS

| | | | | |
|---|---|---|---|---|
| 4,135,240 | A * | 1/1979 | Ritchie | 711/164 |
| 4,274,139 | A * | 6/1981 | Hodgkinson et al. | 709/203 |
| 4,872,125 | A * | 10/1989 | Catlin | 703/16 |
| 5,109,512 | A * | 4/1992 | Bahr et al. | 718/103 |
| 5,287,537 | A * | 2/1994 | Newmark et al. | 712/29 |
| 5,469,439 | A * | 11/1995 | Thaler et al. | 370/437 |
| 5,832,238 | A | 11/1998 | Helms | 710/105 |
| 6,556,574 | B1 * | 4/2003 | Pearce et al. | 370/401 |
| 2002/0152315 | A1 * | 10/2002 | Kagan et al. | 709/228 |
| 2002/0174282 | A1 * | 11/2002 | Murakami et al. | 710/306 |
| 2003/0074413 | A1 * | 4/2003 | Nielsen et al. | 709/206 |
| 2005/0086438 | A1 * | 4/2005 | Peterson et al. | 711/141 |

OTHER PUBLICATIONS

Lu et al. Samba-Bus: A High Performance Bus Architecture for System-On-Chips. Proceedings of the International Conference on Computer Aided Design. ACM. 2003.*
Eureka Technology Inc. EP440 PCi-to-PCI Bridge. Product Summary. 2000.*
Regula, Jack. Using Non-Transparent Bridging in PCI Express Systems. Jun. 1, 2004.*

* cited by examiner

*Primary Examiner*—Mark Rinehart
*Assistant Examiner*—Matthew D Spittle
(74) *Attorney, Agent, or Firm*—Richard Kotuiak; Greenblum & Bernstein P.L.C.

(57) ABSTRACT

A configuration space bus includes a configuration space on a primary interface and an extension or secondary interface in communication with a configuration space of the primary interface. When the primary interface receives a transaction request which it does not recognize, the transaction request is passed to the secondary interface for processing. The primary bus then waits for a response from the secondary bus. If the primary interface receives a transaction request which it does recognize, that transaction request is processed by the primary bus. The extension interface allows the primary bus to receive and process industry standard specification defined commands as well as forward commands defined by a user to the extension bus for processing. Multiple buses may be cascaded to form a primary extension interface, a secondary interface, a third interface, etc. A transaction request is passed down through such a chain of interfaces until an interface recognizes and processes it.

8 Claims, 5 Drawing Sheets

METHOD AND APPARATUS FOR CONFIGURATION SPACE EXTENSION BUS

BACKGROUND OF THE INVENTION

1. Field of the Invention

The invention relates to computer buses, and more particularly to an apparatus and method of expanding the functionality of computer buses.

2. Background Description

An interface is typically needed where computer devices must transfer transactions and commands between one another, so that the transactions or commands of one device can be received and properly interrupted by the other device. An example of such an interface includes a Peripheral Connect Interface ("PCI").

Peripheral Connect Interface is an industry standard system level bus interconnect protocol. A PCI bus allows peripheral devices like memory, video cards, printers, etc. to be functionally added to a computer system. The PCI bus also allows a peripheral using a proprietary system to communicate with the controlling computer using predefined industry standard commands or transactions. Examples of such transactions include memory read and write, interrupts, errors and other messages. Additionally, a PCI bus may send and receive both input/output ("IO") and memory instructions.

Because the function of such an interface is to allow two different devices to communicate with one another, the interface will frequently be designed to an industry standard specification. The industry standard specification specifies the type and format of the allowable inputs and outputs to and from the interface. Accordingly, any device which will interact through the interface must comply with the interface's specifications or protocols.

An example of such an industry standard specification for the PCI interface is PCI Express. A PCI Express interface provides a system level bus interconnect applied to a computer system with a processor having a processor specific local bus. The PCI Express interface may be used where most of any memory and system accesses occur and would also include a PCI host bridge that would allow the system to bridge from the proprietary system of the system bus to the industry standard PCI bus. The PCI bus would then allow the addition and interface of devices like memory, video cards, printers, etc., which would then interact with the processor specific local bus though the PCI bus.

Interfaces can be structured so that there is a hierarchy to the interfaces. Such multiple interfaces may be connected to one another in series or cascaded, or in parallel with one another. Where multiple interfaces are connected to one another, it is frequently necessary to specify a hierarchy of the interfaces. The hierarchy of the interfaces may, among other things, specify how a command, which is received by one of the interfaces, is passed to the other interfaces. In the example of the PCI standard, one PCI interface may have multiple PCI interfaces or buses cascaded underneath it. Thus, a predetermined protocol is required to determine the path that a command or transaction follows as it is passed between interfaces. Examples of commands or transactions that may be passed through or between an interface or interfaces includes interrupts, error messages, etc.

In addition to facilitating communication between a device or a peripheral and a computer system, an interface also may have the capability to allow a computer system to automatically detect and configure a device. Such detection and configuration is commonly referred to as "plug and play" and requires that the interface and the device be capable of sending and receiving commands to configure the computer and the device for operation. Such communication commands may include, for example, memory range, IO range, and number of interrupts. Such configuration commands are transmitted through configuration space. Accordingly, both the interface and the peripheral attached thereto are configured to send and receive commands through configuration space at start-up in order for the computer system to configure the device for use.

A configuration bus is a component of the interface to facilitate the transmission and reception of configuration commands in order to allow software to set-up a system to function with a peripheral and to adjust to hardware changes. Typically, a configuration space has a combination of read only registers which are configured to describe the device. The read only registers are located on the device and include information such as, for example, the type of the device, the class of the device, the manufacturer of the device and registers which define the system resources the device needs to operate. Additionally, the device may have registers that enable the device to generate messages such as an interrupt. Also, the appropriate software drivers may be determined by information in the registers. Thus, configuration space may have a set of predefined read only registers which generally describe the device, describe the required system resources, and registers containing information which enable the bus to begin communication with the device. Also, an interface may utilize configuration commands which are unique to it.

SUMMARY OF THE INVENTION

In a first aspect of the invention, a method of interfacing buses comprises the steps of receiving a transaction request by a first configuration interface from a transaction request source, and passing the transaction request to a first extension interface for processing, if the first configuration interface was not the destination of the transaction request. The method also includes the transaction request source remaining in a wait state until receiving the processed transaction request.

In another aspect of the invention, a method of interfacing interfaces in a configuration space comprises the steps of transmitting a transaction request to a first circuit in a configuration space, and determining whether the first circuit supports the transaction request. The method also includes, if the first circuit does not support the transaction request, forwarding the transaction request to a second circuit for processing, and returning a processed result to a source of the transaction request.

In another aspect of the invention, a method of transmitting a transaction request comprises the steps of forwarding from a transaction request source to a first circuit a transaction request having a transaction request destination. The method also includes generating a transaction request result by the first circuit if the first circuit supports the transaction request, or forwarding the transaction request by the first circuit to a second circuit if the first circuit does not support the transaction request, and waiting for a transaction request result by the transaction request source.

In another aspect of the invention, an apparatus for transmitting a transaction request in configuration space comprises a transaction request source configured to transmit a transaction request and receive a transaction request response. The apparatus also includes multiple circuits arranged in series with one another, wherein each circuit of the multiple circuits is configured to respectively receive and either produce a transaction request response if it supports the transaction request or forward the transaction request if it does not support the transaction request.

In a further aspect of the invention, a computer program product comprising a computer usable medium having readable program code embodied in the medium is provided. The computer program product includes at least one program code to receive a transaction request by a first configuration interface from a transaction request source. The program code also will pass the transaction request to a first extension interface for processing, if the first configuration interface does not support the transaction request, and idle the transaction request source in a wait state until receiving the processed transaction request.

DETAILED DESCRIPTION OF EMBODIMENTS OF THE INVENTION

Industry standard specifications for PCI interfaces includes a configuration space having standard commands to facilitate "plug and play" operation. The configuration space allows a device added to a computer to be automatically configured for operation by the computer by the exchange of PCI specification defined configuration commands to the device. An embodiment of the invention allows expanding the functionality of the configuration space to include transmitting and receiving custom commands which are commands or transaction specific to the device and defined by the device manufacturer to add further control of the device through configuration space. The custom commands are implemented through an extension bus added to the PCI bus. The extension bus may also be referred to as a secondary bus or XBus, and operates in addition and transparent to the standard PCI configuration commands sent through the PCI or primary interface.

Figure 1:
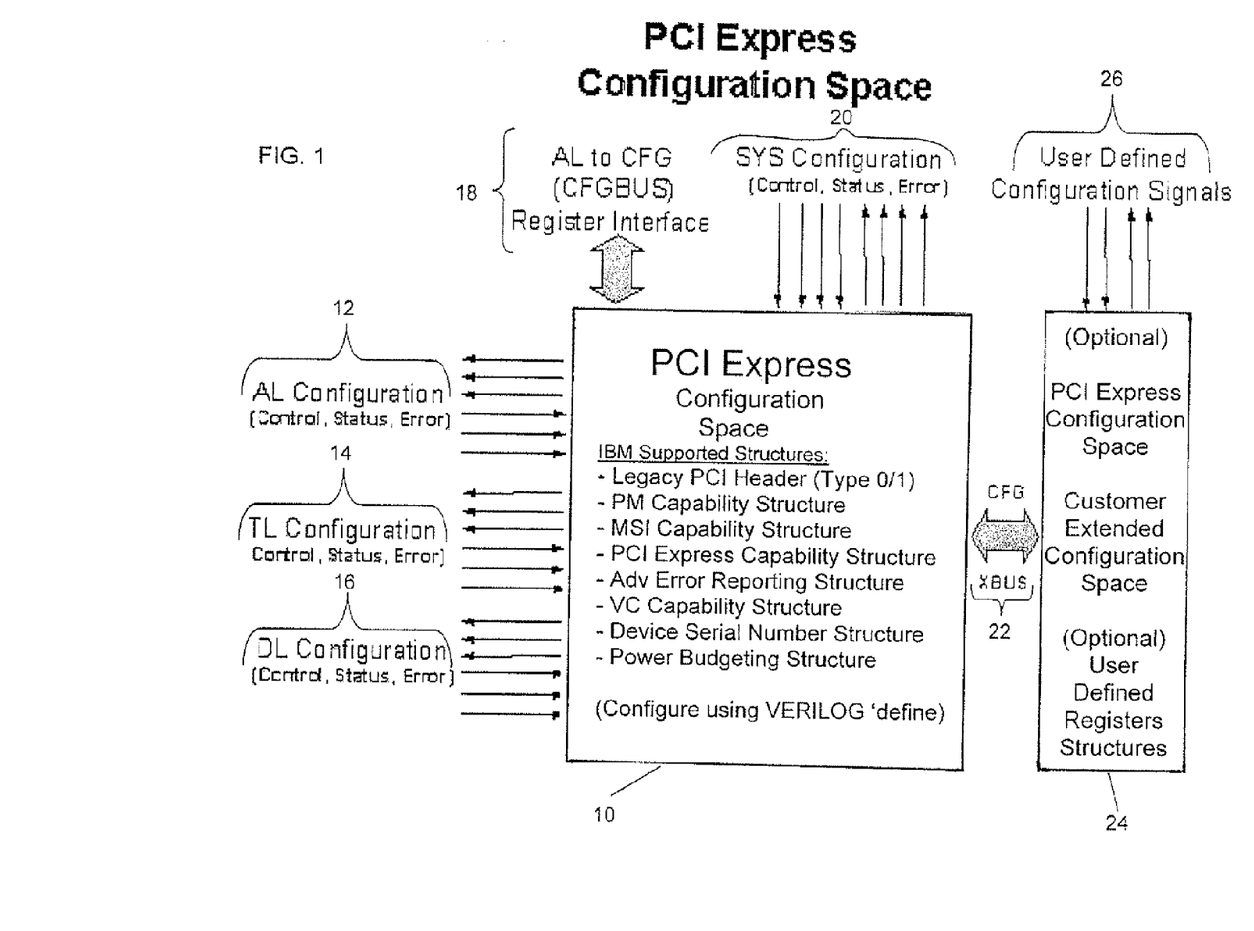
FIG. 1 illustrates an exemplary configuration space.

Referring to FIG. 1, an example of a configuration interface and an extension or second interface is shown. The primary interface includes a configuration space 10. For example, the configuration space 10 may belong to a primary interface such as a PCI Express configuration space. Signals coming into and going out of the configuration space 10 include application logic signals 12. Examples of application logic configuration signals 12 include control, status and error signals. Also transmitted and received by the configuration space 10 are transaction layer logic configuration signals 14. Examples of transaction layer logic configuration signals 14 also include control, status and error signals. Also transmitted and received by the configuration space 10 are data link layer logic configuration signals 16. Examples of data link layer logic configuration signals 16 also include control, status and error signals. The signals 12, 14 and 16 are examples of the various signals which control the device connected to the primary interface.

As used herein a "supported" transaction, means that a particular device, is configured to process the corresponding transaction. As used herein "transaction," "request," "transaction request," "command," "command signal" and "structure" are interchangeable. Also, as used herein, "device," "interface," "bus" and "circuit" are used interchangeably. A "non-supported" or "unsupported" command is unprocessable by the relevant device. Non-supported transactions may include standard specification-defined transactions which are not implemented by the device, as well as custom transactions unique to and defined by the device manufacturer. As an example, a PCI device may not be configured to support all the transaction specified in the PCI specification. Such a PCI device would not be able to process PCI transactions it did not support, in addition to not being able to process non-PCI transactions such as custom transaction as defined by a device manufacturer. The PCI device would then find as unprocessable standard but unsupported PCI commands as well as any custom commands defined by a specific manufacturer.

In the example of FIG. 1, where the primary interface is a PCI Express configuration space, supported structures may include the standard commands of the PCI specification. For example, the standard commands include a Legacy PCI header, and PM capability structure. Also included are MSI capability and PCI Express capability structures. Additional support structures may include advance error reporting structure and VC capability structure. Also included may be device serial number and power budgeting structures. These commands are standard for a PCI interface and are well known in the art, as well as being defined in the PCI specification.

As shown in FIG. 1, signals transmitted and received by the configuration space 10 of the primary bus also may include main bus signals 18. Examples of main bus signals include signals which define how a transaction is transmitted. For example, the address pins of the transaction and whether the transaction is a read or a write.

Also transmitted to and from the configuration space 10 are system level signals 20 for configuration. An example of a system level signal 20 includes a register's content identifying the manufacturer of the device. The system level signal is data in a register directed toward, for example, identifying the manufacturer of the device and tends to not participate in the functioning of the device or the interface, and additionally has little effect on the behavior of the bus and interface.

Another signal transmitted and received by the configuration space 10 includes XBus (extension bus) signal 22. The XBus signal 22 transmits and receives user defined transactions to and from a user defined registers structure 24. The user defined register structure 24 exists in the customer's extended configuration space. And, the user defined register structure 24 transmits and receives user defined configuration signals 26 to and from user defined logic. Additionally, for the case of cascaded or in series XBus interfaces, the subsequent or next-in-line XBuses may be in communication with the user defined registers structure 24, as well.

In operation, a transaction request is received by the configuration space 10 through the main bus 18. If the transaction request is supported by the configuration space 10, the configuration space 10 responds to the transaction and transmits a transaction response back through the main bus 18 or performs the appropriate configuration process. If the configuration space 10 does not support the transaction request received on the main bus 18, the configuration space 10 forwards the transaction request to the XBus 22 and the configuration space 10 goes into a wait state while waiting for a response to the transaction request from the XBus 22.

If the transaction request is a custom transaction request supported by the XBus 22, the transaction request is passed to the user defined register structure 24 and logic blocks for processing. If the XBus 22 does not support the custom transaction and there is a second XBus, the XBus 22 passes the transaction request to a third interface and goes into a wait state pending a response to the transaction request.

Thus, the primary interface 10 retains the capability to process all of the supported standard or base transactions defined by the industry standard specification for that particular interface. Additionally, the primary interface 10 is capable of receiving non-supported transaction requests and custom transaction requests which are not included in the industry defined specification. When the primary interface 10 receives a non-supported or custom transaction request, the primary interface recognizes the transaction request as an unprocessable transaction request and forwards it to the secondary interface or XBus 22 and goes into a wait state pending a response to the unprocessable transaction request.

In general, the XBus may include multiple extension buses attached to the primary interface. Where multiple extension buses are included, a protocol for passing a transaction received by the primary bus to the appropriate secondary bus may be required. For example, the interface system may use a "right of first refusal," to determine whether a particular transaction or command is processed by the primary interface or is transmitted and processed to and by the XBus or first extension. Furthermore, the first extension bus, if it does not support the custom transaction or command, may pass it to a second extension bus which acts on the custom transaction in a similar manner as to the first extension bus. Meanwhile, the primary bus may remain in a wait or idle state until the custom transaction or command has been acted upon and the primary bus receives a response in accordance to the custom transaction or command. Additionally, when an interface supports and acts upon the received custom transaction, it sends an "acknowledge" command to the primary bus. If the interface does not support the custom transaction and passes it to the next interface, it sends a "not acknowledge" transaction to the primary bus.

Figure 2:
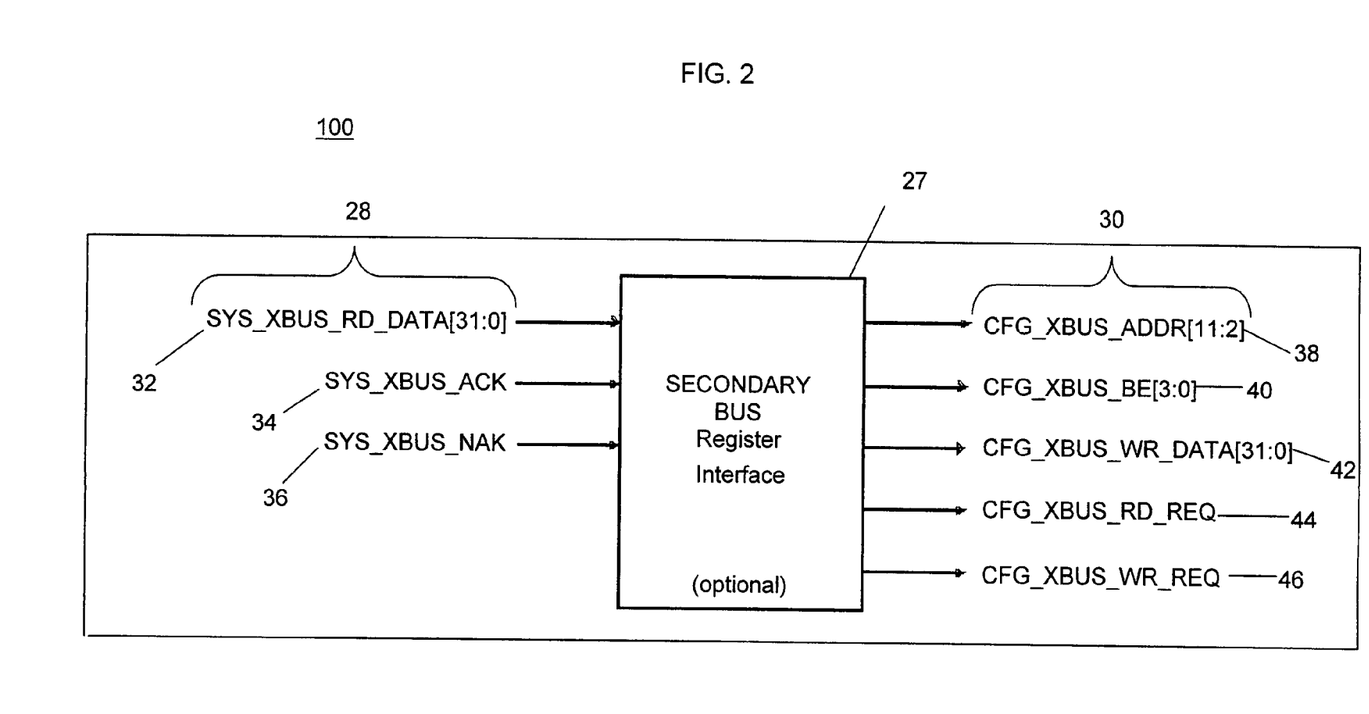
FIG. 2 illustrates an embodiment of a register interface for an embodiment of the invention.

Referring to FIG. 2, a secondary or extension bus signal system 100 is shown. The secondary bus 27 may send and receive a series of output signals 30 and a series of input signals 28. The secondary bus 27 may generate an address transaction 38, a bite enable transaction 40, a write data transaction 42, a read request 44, or a write request 46. Correspondingly, the secondary bus 27 may receive in response to one of its output transactions 30, a read data signal 32 and an acknowledge signal 34. Alternatively, if the signal is not supported, the secondary bus 27 receives a not acknowledge signal 36.

Figure 3:
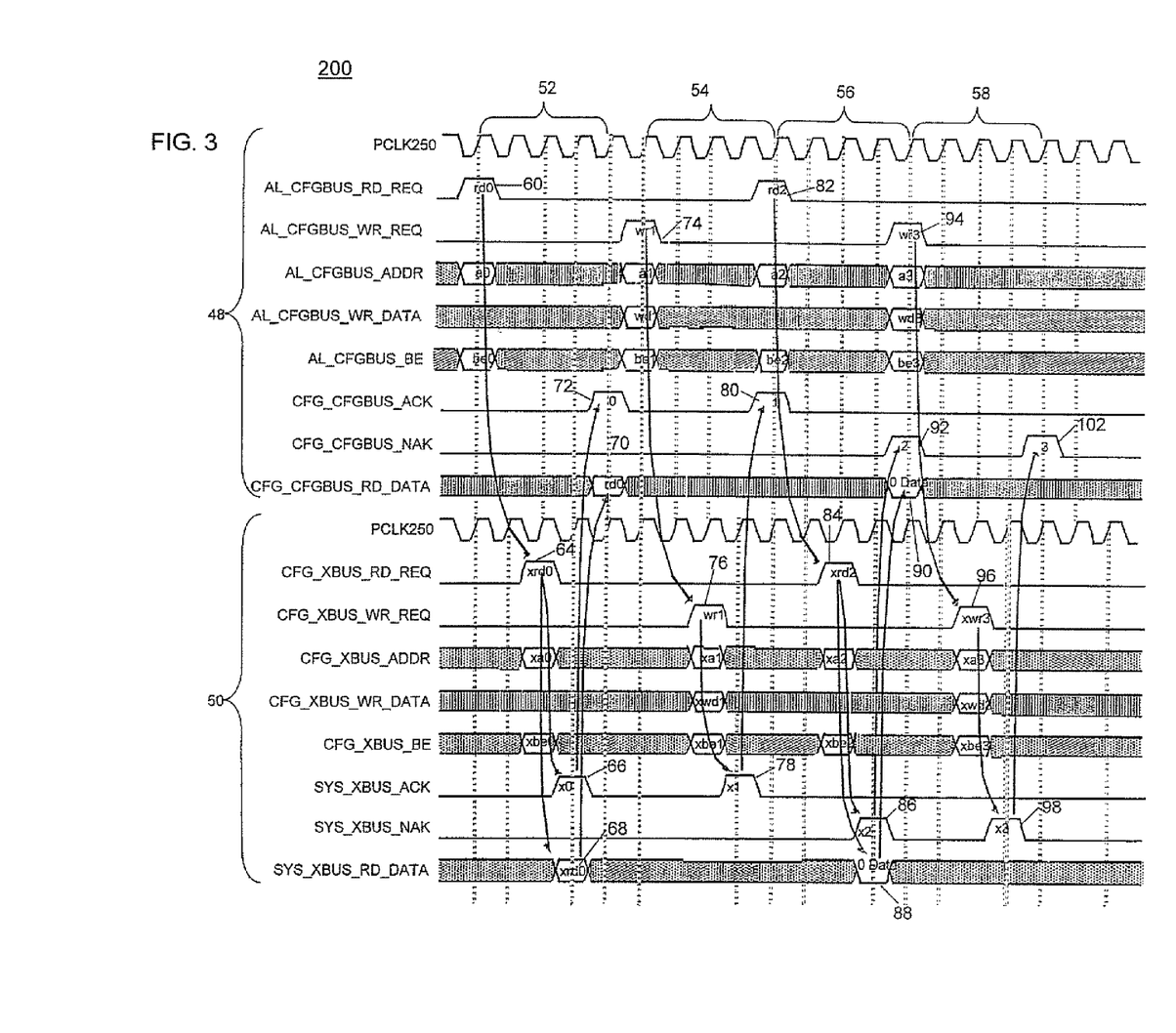
FIG. 3 illustrates a diagram of interface timing for an embodiment of the invention.

Referring to FIG. 3, a timing diagram 200 illustrates an example of the relative timing for primary bus pins 48 and secondary bus pins 50. For example, transactions of a PCI Express bus configuration space with an extension of secondary bus. The timing diagram 200 includes a first transaction 52, a second transaction 54, a third transaction 56, and a fourth transaction 58. In the first transaction 52, the primary bus pins 48 generate a read request signal 60. The read request signal 60 generated by the primary bus pins 48 is transmitted to the secondary bus pins 50 and appears as a read request signal 64. The read request signal 64 generates an acknowledge signal 66 and a read data signal 68 in the secondary bus, which are transmitted back to the primary bus pins 48. The acknowledge signal 68 and the read data signal 68 received from the secondary bus generate an acknowledge signal 72 and a read data signal 70 on the primary bus pins 48, thus ending the first transaction.

The second transaction 54 starts with a write request signal 72 on the primary bus pins 48. The write request signal 74 is transmitted to the secondary bus pins 50 and generates a write request signal 76 on the secondary bus pins 50. The write request signal 76 generates an acknowledge signal 78. The acknowledge signal 78 is transmitted from the secondary bus pins 50 to the primary bus pins 48 causing an acknowledge signal 80 in the primary bus and thus, ends the second transaction 54, thus ending the second transaction.

The third transaction 56 starts with a read request signal 82 on the primary bus pins 48. The read request 82 in the primary bus is transmitted to the secondary bus pins 50, the secondary bus causing a read request signal 84 to appear in the secondary bus. The read request signal 84 in the secondary bus causes a not acknowledge signal 86 and generates a read data signal 88 having no data therein. The not acknowledge signal 86 and the empty read data signal 88 are transmitted from the secondary bus to the primary bus pins 48 where a not acknowledge signal 92 and an empty read data signal 90 are created, thus ending the third transaction.

The fourth transaction 58 starts with a write request signal 94 in the primary bus. The write request signal 94 is transmitted from the primary bus pins 48 to the secondary bus pins 50 where it creates a write request signal 96 in the secondary bus. The write request signal 96 in the secondary bus 50 generates a not acknowledge signal 98 in the secondary bus. The not acknowledge signal 98 in the secondary bus 50 is transmitted to the primary bus where it creates a not acknowledge signal on the primary bus pins 48, thus ending the fourth transaction.

Figure 4:
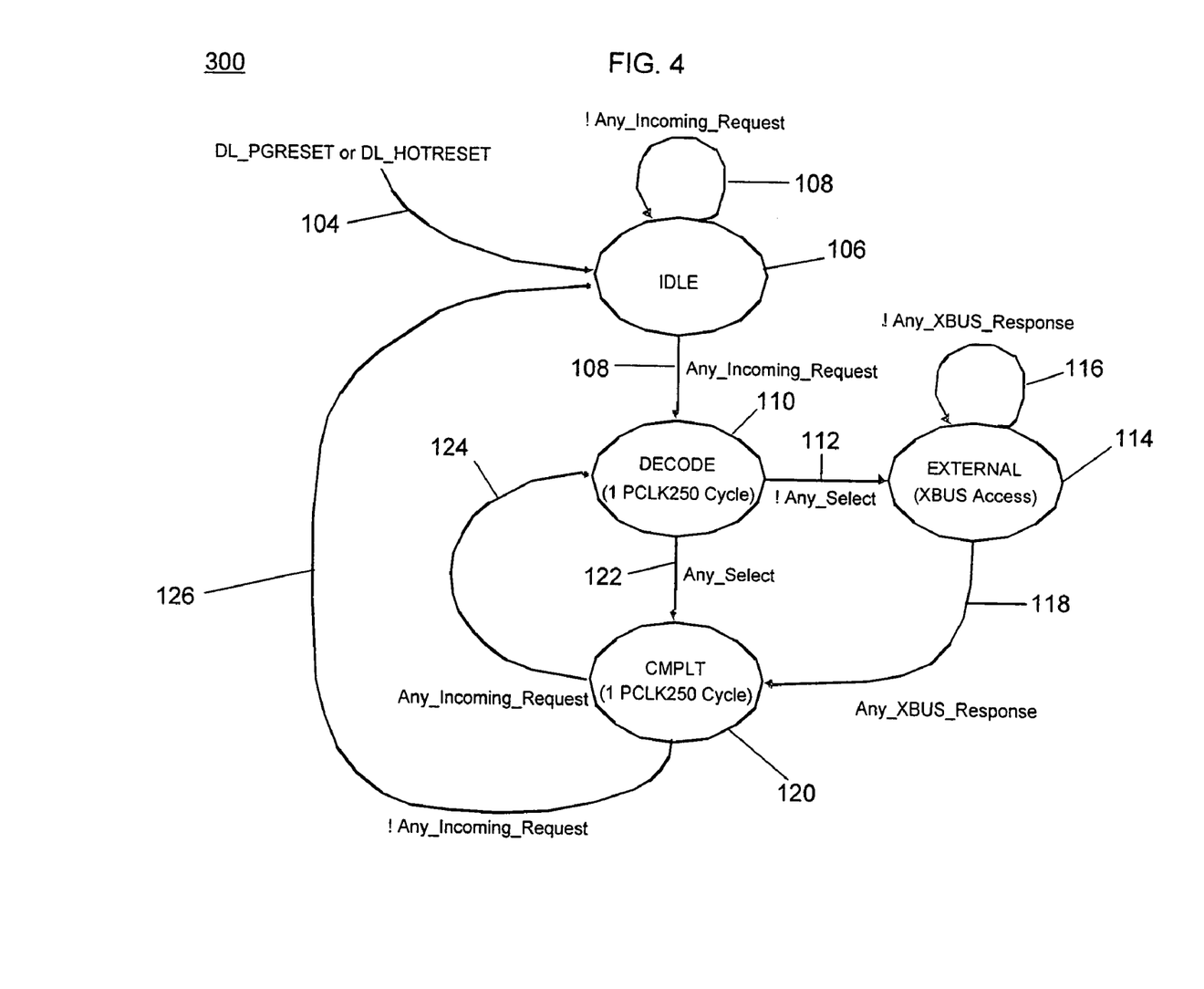
FIG. 4 illustrates a state machine diagram for an embodiment of the invention.

Referring to FIG. 4, a state machine diagram 300 is shown demonstrating the primary bus remaining in an infinite wait state while waiting for a response to a transaction request sent to a secondary bus. At the start of the process, a reset command 104 is required to reset all bus interface logic to the idle state. The logic of the primary bus is then initially in an idle state 106. The idle state 106 maintains the primary bus logic circuit in an idle state while waiting for a transaction request. While in the idle state 106, the logic is configured to receive a request. If there are no requests, the logic stays in the idle state 106 until a request is received.

When in the idle state 106, the logic receives an incoming request 108. The incoming request 108 can be, for example, a read or write request on the system bus. When the incoming request 108 is received, the logic transitions to a decode state 110. In the decode state 110, the logic determines whether the request can be processed by the logic or whether the request must be passed to the secondary bus. If the logic determines that the request can be decoded by the logic of the primary bus (i.e. the request is supported by the primary bus logic), it does an "any select" and transitions to a complete state 120. If the logic cannot decode the request (i.e. the request is not supported by the primary bus logic), it is transitioned to a secondary or an external state 114 to access the extension bus. Before receiving the request 112, the external state 114 is in an idle state 116 waiting for a request to be inputted.

When in the external state 114 and a response 118 is generated, the logic goes into the complete state 120. Once a request has been sent to the secondary interface, the logic stays in an external state 114 until a response is received. A response from the secondary interface may include, for example, an acknowledge or a not acknowledge signal. Once in the complete state 120 and the request has been responded to, the logic will either transition 126 back into the idle state 106 or optionally transition 124 directly to the decode state 110 if another request is pending to speed processing. If the logic determines that it can decode the request, the system transitions 122 into the complete state 120.

Figure 5:
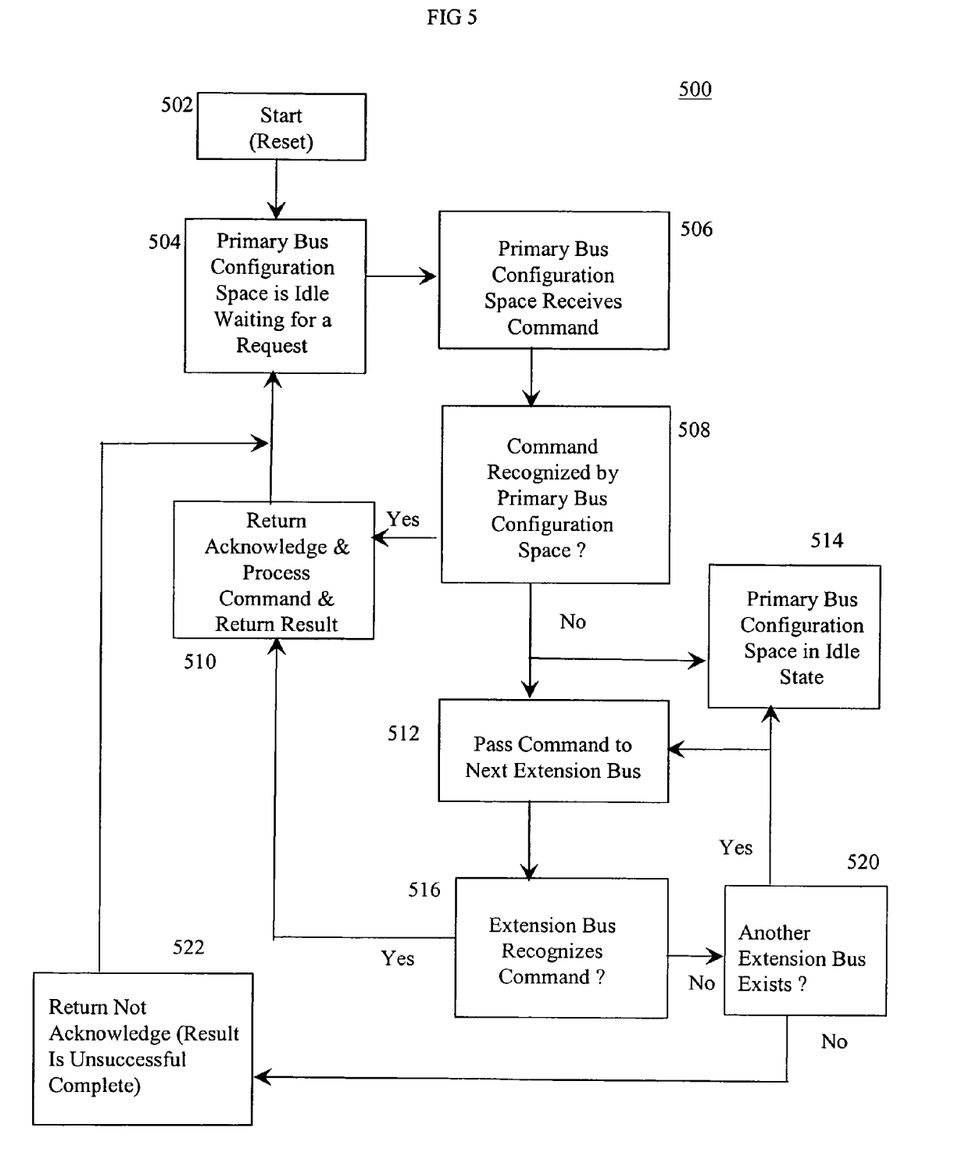
FIG. 5 is a flow chart of an embodiment showing steps of using the invention.

Referring to FIG. 5, a flow chart of an embodiment showing steps of using the invention beginning at 502. FIG. 5 may equally represent a high-level block diagram of components of the invention implementing the steps thereof. The steps of FIG. 5 may be implemented on a computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIG. 5 may also be implemented, for example, using the components represented by FIG. 1.

Continuing with FIG. 5, the method of interfacing starts (502) when the system is powered-up. At power-up, the system is in a wait or idle state (504) while waiting for a command to be received by the configuration space of the primary bus. When a command is received by the primary bus configuration space (506), the primary bus configuration space determines whether it supports the command (508). If the command is supported, the command is processed and a result is returned (510) by the primary bus, and the system goes back into an idle state (504).

If the primary bus configuration space receives a command it does not support (either a non-supported command from the industry specification or a custom command defined by a manufacturer), the command is passed to the next-in-line extensions bus (512) and the configuration space goes into an idle state (514) while waiting for a response to the command. The next-in-line extension bus then determines whether it supports the command (516). If the extension bus supports the command, the extensions bus processes the command and returns the result (510).

If the extension bus does not support the command, the system determines if there is another extension bus cascaded to the system (520). If there is a subsequent extension bus, the system re-enters the loop of sending a command to the next-in-line extension bus by passing the command to the next extension bus in the cascade of extension buses (512), while the primary bus configuration space remains in an idle state (514). If the command remains unprocessable after passing through all the extension buses of the system, a not acknowledge command indicating that the command has been unsuccessfully completed is generated (522) by the last circuit and propagated up through the hierarchy of extension buses as the result to terminate the command. Thus all commands are responded to by the system. For some systems, an unsuccessfully completed signal may generate an error.

Incorporating an XBus into a pre-existing interface protocol allows for reusing many of the commands or transactions of the pre-existing protocol for XBus functioning. Table 1 shows an example of configuration space register extension bus interface I/O signals as applied to the PCI Express standard. It should be understood that the signal names provided are exemplary illustrations and should not be considered limiting features. Thus, other signal names may equally be used with the invention.

TABLE 1

| Signal Name | Type | Timing | Description |
| --- | --- | --- | --- |
| SYS_XBUS_RD_DATA[31:0] | Input | Mid | Configuration register extension bus (XBus) read data to the CFG core. The user extended configuration space logic must return all 0's on this read data bus when the read request is unsupported (no address decode match) and the access is terminated with XBUS_NAK. |
| SYS_XBUS_ACK | Input | Mid | Configuration register extension bus (XBus) access acknowledge (access complete) to the CFG core. |
| SYS_XBUS_NAK | Input | Mid | Configuration register extension bus (XBus) access not acknowledge (unsupported access requested, no address decode match) to the CFG core. |
| CFG_XBUS_ADDR[11:2] | Output | Early | Configuration register extension bus (XBus) address bus [11:2]. Both CFGBUS and XBus are always a 32-bit (DWord) access, therefore, the two least significant address bits are always wired to zero internally, and are not included as PCIEXCFG core I/O signals. -State after DL_HOTRESET = 0 -State after DL_PGRESET = 0 |
| CFG_XBUS_BE[3:0] | Output | Early | Configuration register extension bus (XBus) byte enables to the user implemented extended configuration logic. The user extended configuration space logic can ignore the byte enable bus on read requests and return all 32 bits of data on the XBUS_RD_DATA bus. |
| CFG_XBUS_WR_DATA[31:0] | Output | Early | Configuration register extension bus (XBus) write data bus to the user implemented extended configuration logic. -State after DL_HOTRESET = 0 -State after DL_PGRESET = 0 |
| CFG_XBUS_RD_REQ | Output | Early | Configuration register extension bus (XBus) access read data request to the user implemented extended configuration logic. -State after DL_HOTRESET = 0 -State |

TABLE 1-continued

| Signal Name | Type | Timing | Description |
| --- | --- | --- | --- |
| CFG_XBUS_WR_REQ | Output | Early | after DL_PGRESET = 0 Configuration register extension bus (XBus) access write data request to the user implemented extended configuration logic. -State after DL_HOTRESET = 0 -State after DL_PGRESET = 0 |

As the above table shows, XBus may reuse many of the pre-existing format's command structure (PCI Express in this example), thereby simplifying adapting the XBus method to an of the pre-existing interface protocols, as well as any yet-to-be-developed interface protocols. For example, when the XBus method is applied to the PCI Express interface, all XBus cycles are started by the assertion of CFG_XBUS_WR_REQ (write cycle request) or CFG_XBUS_RD_REQ (read cycle request), and are completed by the assertion of SYS_XBUS_ACK (indicating that the request was completed successfully) or SYS_XBUS_NAK (indicating the request ended unsuccessfully).

For PCI Express, both XBus request signals (CFG_XBUS_WR_REQ and CFG_XBUS_RD_REQ) are latched (sampled) by the customer logic of the device at the start of any access, and should not be sampled during the multi-clock access cycle. The XBus request signals should not be sampled again until the current XBus access is complete, as indicated by the assertion of an XBus access termination signal (SYS_XBUS_ACK or SYS_XBUS_NAK) from the customers external logic.

Because in PCI Express the PCIEXCFG core latches all XBus input signals, the devices external XBus logic never sees back-to-back XBus requests from the PCIEXCFG core. That is, the PCIEXCFG core never asserts a new request signal on the ending XBus cycle (when SYS_XBUS_ACK or SYS_XBUS_NAK are asserted). The XBus request signals are latched (sampled) on the clock cycle immediately following the ending cycle, and continue to be latched on every clock cycle thereafter, until another active XBus request is sampled starting a new access. The XBus request signals (CFG_XBUS_WR_REQ and CFG_XBUS_RD_REQ) are mutually exclusive. The simultaneous assertion of both XBus request signals is an error resulting in unpredictable behavior.

The CFG_XBUS_ADDR and CFG_XBUS_BE input signals of PCI Express are latched (sampled) once, and only once, on the first cycle that CFG_XBUS_WR_REQ or CFG_XBUS_RD_REQ are asserted (the start of the XBus access). These input signals are not used at all other times. The CFG_XBUS_WR_DATA bus input signals are latched (sampled) once and only once, in the first cycle that CFG_XBUS_WR_REQ is asserted, indicating the start of the XBus write cycle. These input signals are not used (that is, don't care) at all other times.

In PCI Express, the SYS_XBUS_RD_DATA bus signals, in embodiments, are only valid on read cycles during the cycle that the access termination signals (SYS_XBUS_ACK or SYS_XBUS_NAK) are asserted (indicating the ending cycle of the read access). These signals are undefined at all other times. The SYS_XBUS_RD_DATA bus returns all zeros on any read request that is completed with the assertion of SYS_XBUS_NAK, indicating the read request cycle has ended unsuccessfully (that is, external XBus customer logic address miss).

The XBus termination signals (SYS_XBUS_ACK and SYS_XBUS_NAK) of PCI Express are mutually exclusive. The simultaneous assertion of both XBus termination signals is an error resulting in unpredictable behavior. The XBus termination signals (SYS_XBUS_ACK and SYS_XBUS_NAK) shall only be asserted for one PCLK250 clock cycle, but can be asserted in any cycle after the request signals (CFG_XBUS_WR_REQ and CFG_XBUS_RD_REQ) are sampled, indicating the start of an access. That is, the minimum number of clock cycles to complete any XBus access is two, and the maximum is 'infinity' (that is, every XBus access has 1-n wait states). Therefore, both the CFGBUS and XBus "hang" if one of the XBus access termination signals are not asserted in response to the XBus request.

In a PCI Express environment, the XBus external customer logic uses the globally defined PCI Express reset signals (DL_HOTRESET and DL_PGRESET). These IBM PCIEXCFG reset signals have priority above all other XBus signals and cancel any XBus access in process when the asserted reset is sampled on the next rising edge of the PCI Express system clock (PCLK250). All other XBus signals are ignored as long as any reset signal is asserted.

For PCI Express, both XBus request signals (CFG_XBUS_WR_REQ and CFG_XBUS_RD_REQ) and both XBus termination signals (SYS_XBUS_ACK and SYS_XBUS_NAK) are de-asserted and stable, on the clock cycle before both reset signals (DL_HOTRESET and DL_PGRESET) are de-asserted (coming out of reset). The XBus request signals may be asserted, to start an XBus access, two cycles after the release of reset. The XBus byte enable signals (CFG_XBUS_BE[3:0]) are valid on all XBus accesses (determinate when any request signal is active). The byte enables are always used on write requests, however, XBus customer logic may optionally ignore the byte enable selects on read requests, and may return all 32bits of register data on the read data bus (SYS_XBUS_RD_DATA).

As discussed above, in one implementation of the extension bus the subsequent interfaces are configured to support and act upon the same set of base functions or transactions utilized by the primary interface, in addition to the commands not supported by the primary bus and custom commands developed and implemented by the device manufacturer. For example, when applying the XBus method to a PCI Express interface, the PCIEXCFG core XBus (PCI Express configuration space extension bus) uses the same basic protocols and signal names as the primary CFGBUS register interface. The XBus provides a framework for PCI Express solutions requiring customer specific PCI Express data structures or user defined registers.

When the PCIEXCFG core is configured to include an XBus, any CFGBUS access that would normally be completed as an unsuccessful access (by asserting CFG_CFGBUS_NAK) is passed to the XBus for service by the external customer specific logic. If the customer's external logic is able to service the request (configuration space address match), the external logic responds to the XBus request with the SYS_XBUS_ACK. If the customer's external XBus logic is unable to service the XBus request (configuration space address miss), it responds to the XBus request with the SYS_XBUS_NAK.

With the exception of the delayed response (at least 1-n clock cycles as well as 2-n clock cycles, etc.), the initial CFGBUS request is serviced and the application logic has no real knowledge that the request was serviced internal or external to the PCIEXCFG core. As such, the XBus allows unlimited expansion of the PCI Express configuration space address map external to the IBM PCI Express core, with no impact to the overall IBM PCI Express architecture. Once again, the XBus protocol is the same as the primary CFGBUS register interface.

Although discussed in the context of application to the PCI standard, the XBus may be generally utilized in any interface system when a transaction or command is not supported by the standard configuration space. When the transaction or command is not supported, it is determined to be an unsupported standard command or a custom or user defined transaction and is passed to the XBus. If the XBus or secondary bus supports the transaction, the XBus then passes it to the appropriate user-specific logic of the associated device allowing the user-specific logic to act upon it. The supported transactions, which the XBus may receive and pass to the user-specific logic, may include any command or transaction defined by the device manufacturer as well as standard commands not supported by the devices higher up in the device hierarchy. The custom transactions may include a virtually unlimited number of types of transactions and commands as determined and defined by each device manufacturer. The configuration space having an XBus includes a reusable configuration space IP that will service all of the supported transactions and commands defined in the standard as required, and will additionally service non-supported commands and custom commands and transactions as defined by the device manufacturer.

While the invention has been described in terms of exemplary embodiments, those skilled in the art will recognize that the invention can be practiced with modifications and in the spirit and scope of the appended claims.

What is claimed is:

1. An apparatus for transmitting a transaction request in configuration space, comprising:
   a transaction request source configured to transmit a transaction request and receive a transaction request response; and
   multiple circuits arranged in series with one another, wherein each circuit of the multiple circuits is configured to respectively receive and each of produce a transaction request response if it supports the transaction request and forward the transaction request if it does not support the transaction request.

2. The apparatus of claim 1, wherein at least one circuit of the multiple circuits comprises a configuration space.

3. The apparatus of claim 1, wherein the transaction request comprises either a standard command or a custom command.

4. The apparatus of claim 3, wherein at least one circuit of the multiple circuits is configured to recognize the custom command and transmit a transaction request response in response to the custom command.

5. The apparatus of claim 4, wherein the at least one circuit configured to recognize the custom command is further configured to transmit an acknowledgement response indicating that the custom command was completed successfully.

6. The apparatus of claim 5, wherein the transaction request source is configured to receive the acknowledgement response.

7. The apparatus of claim 1, wherein the transaction request source is configured to receive a transaction request response substantially anytime after transmitting the transaction request.

8. The apparatus of claim 1, wherein one circuit of the multiple circuits is a configuration space, another circuit of the multiple circuits is at least one XBus, and another circuit of the multiple circuits is a user defined register structure.

* * * * *